Nov. 3, 1931.  F. A. DAVIDSON  1,830,094
COUPLING DEVICE
Filed Oct. 26, 1929  2 Sheets-Sheet 1
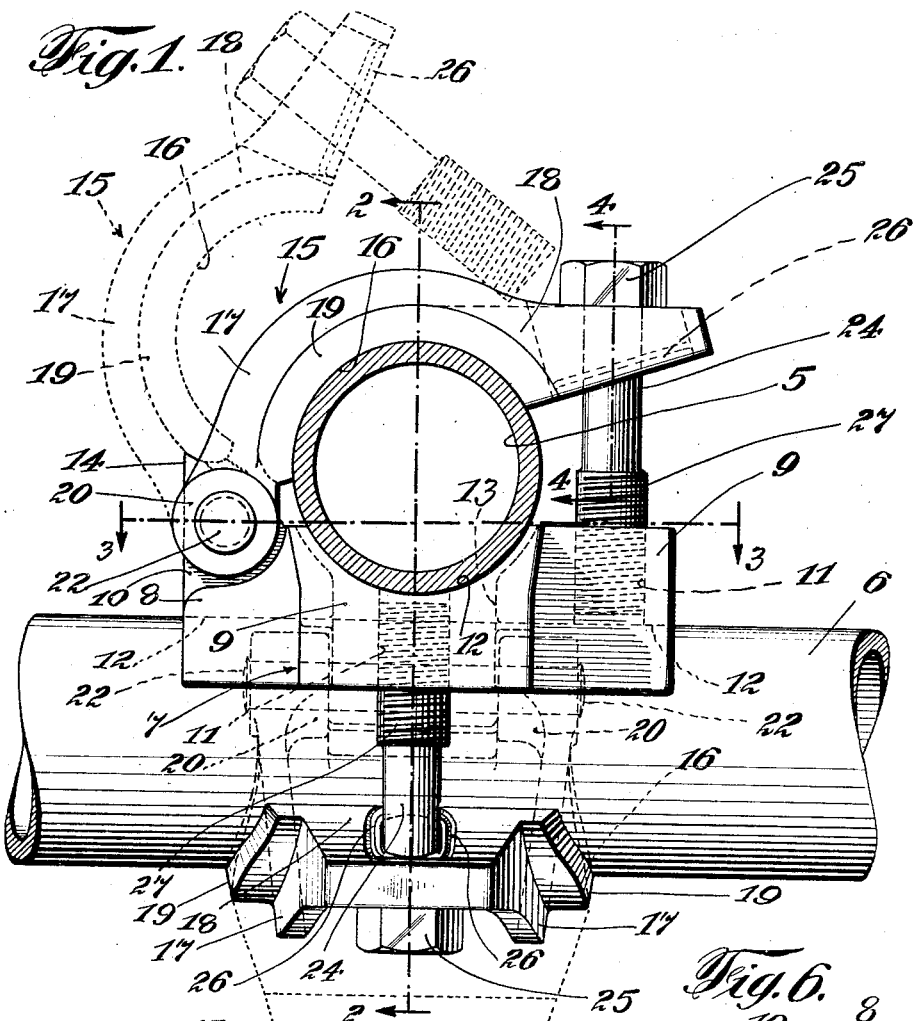
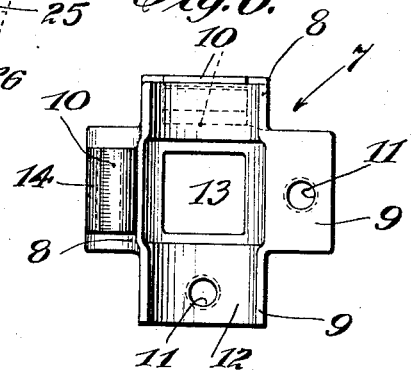
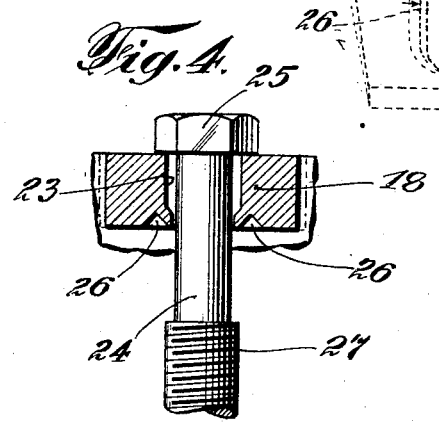
INVENTOR
Frederic A. Davidson
BY C. S. Goepel
his ATTORNEY

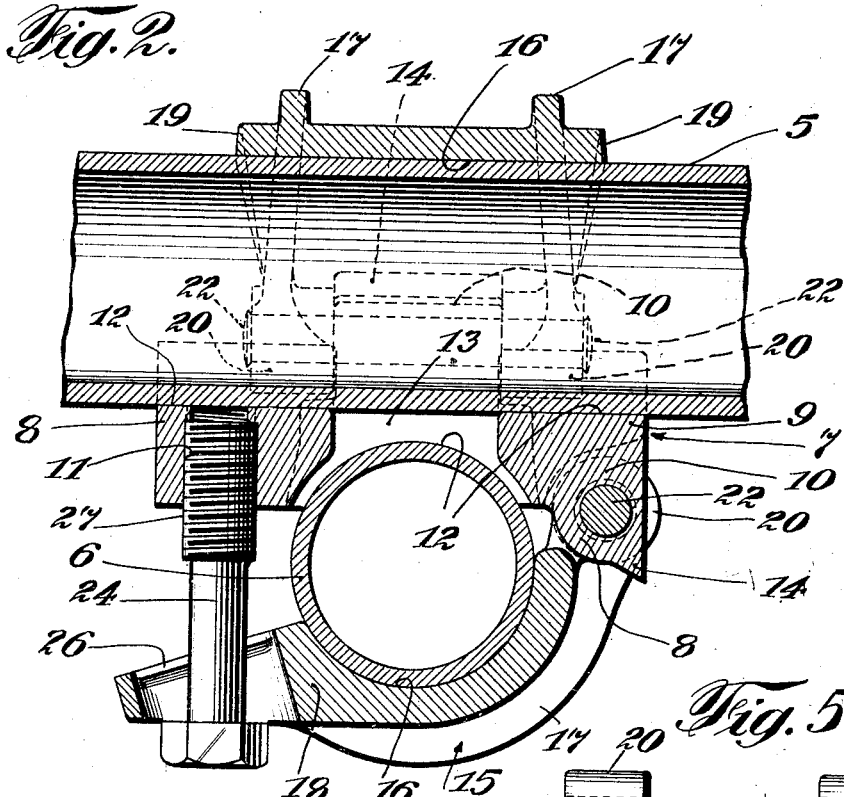

Patented Nov. 3, 1931

1,830,094

UNITED STATES PATENT OFFICE

FREDERIC A. DAVIDSON, OF BAYSIDE, NEW YORK, ASSIGNOR TO AMERICAN SAFETY DEVICE CO., OF NEW YORK, N. Y., A CORPORATION OF NEW YORK

COUPLING DEVICE

Application filed October 26, 1929. Serial No. 402,609.

This invention relates to coupling devices, and has for its general object and purpose to provide certain desirable improvements in coupling devices of the general character shown and described in Patent No. 1,706,214, issued March 19, 1929.

Such coupling devices for rigidly connecting crossed supporting elements have been adopted and widely used in the erection of scaffolding employed in the construction, repair or decoration of buildings. The supporting elements, particularly when the scaffolding is employed in the interior decoration or repair of churches, halls or auditoriums, the use of which is continued during the progress of work, are in the form of metal tubing of small diameter so that obstruction to the vision of members of the audience from various parts of the auditorium is reduced to a minimum.

It is further desirable to not only provide an easily applied and efficient coupling means for the tubular supports of the scaffold staging and which will insure the necessary stability and rigidity of the supporting elements, but that such coupling or connecting means between said elements, in the form and construction of its several parts, shall present a more or less esthetic or ornamental appearance so that it will not be conspicious or unsightly.

It is therefore, an important object of my present invention to provide a coupling means of this kind, the several parts of which are of such form and construction as to satisfactorily accomplish the above purpose and effect a material increase in the strength and durability of the device, with greater utility and convenience in its application to or removal from the crossed supporting elements.

Briefly, my present invention consists essentially in the provision of a cruciform body member, having channels or grooves in its opposite sides extending in angular relation to each other and providing seats to receive the opposed side portions of the crossed elements to be coupled, and an adjustable clamping section pivotally mounted at one of its ends on one side of the body section to extend across the other side portion of one of the crossed elements and having a curved seating face engaging therewith, and each of said clamping sections having an adjustable bolt permanently connected with the free end thereof and adapted for threaded engagement in an opening formed through one of the arms of said cruciform body section.

It is also one of the detail objects of the invention to provide an improved construction of said pivoted clamping sections whereby an extensive bearing surface is provided for engagement with the supporting element, and said sections are also reinforced and rendered more or less ornamental in appearance.

A further object of the invention is to eliminate the use of adjustable clamping nuts which may become detached and lost and to provide simple and effective means for inseparably retaining the adjustable bolts in connection with the pivoted clamping elements while at the same time permitting of the free relative angular movement of the clamping elements and the bolts in the attachment of the device.

With the above and other objects in view, the invention consists in the improved coupling device and in the form, construction and relative arrangement of the several parts thereof as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Figure 1 is a plan view, one of the supporting elements being shown in section and illustrating one simple and practical embodiment of my invention as applied in use;

Fig. 2 is a sectional view taken on the line 2—2 of Fig. 1;

Fig. 3 is a sectional view taken on the line 3—3 of Fig. 1;

Fig. 4 is a detail sectional view taken on the line 4—4 of Fig. 1, showing the means for retaining the adjustable bolts in connection with the pivoted clamping elements;

Fig. 5 is a detail side elevation of one of the clamping elements, and

Fig. 6 is a side elevation of the body section of the device.

In the illustrated embodiment of the invention, the two supporting elements 5 and 6 respectively, are in the present instance, shown in the form of cylindrical metal tubing extending adjacent to each other in crossed right angular relation.

The coupling device of my present invention includes a body section generally indicated at 7, and which, as shown in Fig. 6 of the drawings, is of cruciform shape having the integrally connected arms 8 and 9 respectively, extending at right angles to each other. Each of the arms 8 on relatively opposite sides of said body section is centrally formed with a sleeve 10 while each of the arms 9 has a threaded opening 11 centrally formed therethrough.

The other side of each arm 8 and the corresponding side of the arm 9 which is in alignment therewith is provided with a concave seat 12 to receive one side of one of the supporting elements 5 or 6.

From reference to Fig. 2 of the drawings, it will be noted that the center of this body casting between the arms 8 and 9 is open as indicated at 13. However, in view of the thickness of the casting, the integral connecting portions or webs between the arms 8 and 9 will afford the requisite strength preventing any possibility of the fracture of these webs or separation of the arms 8 and 9 under excessive strains. Thus, while I secure the necessary strength in the structure of said body casting, the weight therof is kept at a minimum.

It will also be observed from reference to Fig. 1 of the drawings that each of the arms 8, at the outer side thereof is formed with an upwardly projecting rib or lug 14. The purpose of these lugs will be hereinafter explained.

With the body section above described, two of the clamping members 15 of the form illustrated in Fig. 5 of the drawings are associated. Each of these clamping members also consists of a casting having a concavo-convex body plate, which however, is of appreciably less thickness than the body section 7 of the device and provides on the inner face thereof a concave seat 16. This body plate longitudinally thereof tapers in width from one end to the other and is provided on its outer face and along its opposite longitudinal edges with reinforcing ribs or flanges indicated at 17 which merge into the narrower end of the body plate of said member which is of comparatively great thickness, and tapers in thickness from the ends of the ribs 17 to the extremity of the clamping element as indicated at 18. The opposite side edge portions of the clamping plate or element project laterally beyond the reinforcing ribs 17 and perferably having their edge faces curved on convex lines as shown at 19 and at their opposite ends gradually merge into the ends of the ribs 17. Thus as shown in Fig. 5 of the drawings, the face view of this clamping element presents a symmetrical and more or less ornamental appearance.

The wider end of the clamping element 15 is formed with the spaced lugs or knuckles 20 at opposite sides of the recess 21 which is adapted to receive one of the sleeves 10 on the body section 7. Thus, it will be understood that these clamping members are respectively arranged on opposite sides of the body casting and are permanently and inseparably connected therewith by means of the hinge pins 22 extending through the aligned bores of the sleeves 10 and the lugs or knuckles 20.

The thick tapering free end portion 18 of each clamping member has a longitudinally elongated slot 23 formed therethrough, and in this slot, the unthreaded shank portion of a clamping bolt 24 is freely movable both axially of said bolt and to various angular positions with respect to the clamping element. The polygonally shaped head 25 on one end of the bolt limits the movement of said bolt in one direction through the slot and coacts with the outer face of the end portion 18 of the clamping element. After the bolt has been positioned through the slot, the metal of the end portion 18 of the clamping element at the inner face thereof and at opposite edges of the slot 23 is swaged inwardly as clearly indicated at 26 in Fig. 4 of the drawings, thus narrowing said slot at the inner side of the part 18 so that the threaded section 27 of the bolt 24 cannot enter said slot, and thereby limiting the outward movement of the bolt through the slot.

In the application of the coupling devices above described for the purpose of rigidly connecting the crossed supporting elements 5 and 6 with each other, the respective clamping elements 15 are first moved to the dotted line position shown in Fig. 1 of the drawings until the end of the clamping element between the lugs 20 thereof contacts with the rib or projection 14 on the body casting. Thus pivotal or swinging movement of these clamping elements away from the body casting is limited, and they are thereby positioned and retained in such relation to the opposite sides of the body section 7 that they will not obstruct or interfere with the movement of the body section to a position between the crossed supporting elements. Thus, this section may be very easily and quickly positioned with the opposed sides of the crossed elements engaged upon the concave seats 12 provided in the opposite sides of the body section. The two clamping sections 15 are then swung inwardly across the respective elements 5 and 6, so as to engage their concave faces or seats 16 upon the outer sides of said supporting elements. The bolts 25 are then adjusted in the slotted ends of the clamping sections 15 and threaded into the respective openings 11 in the arms 9 of the body section. As the head 25 of the bolt is thus brought into bearing contact against the end portion 18 of the clamping section, said clamping section is forced inwardly and the tubular supporting element is thereby rigidly and tightly clamped between the seats 12 and 16 of the body section and the clamping section respectively. It will be noted from reference to Fig. 1 of the drawings, that the strain is taken up largely by the bolt head 25 seating against the tapered outer face of the end portion 18 of the clamping section which is disposed substantially in a horizontal plane, thus to a great extent, relieving excessive strains upon the hinge pins 22.

From the foregoing description considered in connection with the accompanying drawings, the construction and several advantages of my new coupling device will be clearly understood. It will be seen that by permanently attaching the adjustable clamping bolt to the free end of the pivoted clamping section of the device, instead of to the body section thereof, I eliminate the use of nuts, which are liable to become accidentally unthreaded from the bolts and lost. At the same time, these clamping bolts may be very easily and quickly adjusted, regardless of the angle which the end portion of the clamping section may assume with respect to the axis of the supporting element 5 or 6 and threaded into the openings 11 of the body section 7. Thus, I have materially increased the utility of such devices, rendering their proper application to the elements to be coupled or their removal therefrom the work of but a few seconds, and with greater assurance of absolute security in the connection. At the same time, I have so formed and constructed the parts of the device as to render the same inconspicuous and more or less ornamental in appearance, which is a factor of importance especially in the use of such devices in connection with the erection of interior scaffolding.

The stop rib or projection 14 on the body casting of the device with which one of the clamping elements 15 engages also provides a means whereby the clamping element when in the dotted line position of Fig. 1 may serve as a temporary support for the horizontal supporting element 5 or 6 after the other clamp has been attached to the vertical supporting element, and while the workman is securing the necessary tools for adjusting the element 15 of the other clamp and securing the same in its closed position.

I have herein shown and described an embodiment of the invention, which is simple, practical, reliable and efficient for the purposes in view and capable of manufacture at nominal cost. However, it is to be understood that the essential and novel features of my present disclosure might also be exemplified in various other structural forms and I accordingly reserve the privilege of resorting to all such legitimate modifications in the details of the several parts as may be fairly considered within the spirit and scope of the invention as claimed.

I claim:

1. A device for rigidly coupling two crossed elements, comprising a body section in the form of a flat metal casting having channels formed in the opposite sides thereof and disposed in crosswise angular relation to each other, said body section being adapted to be positioned between the elements to be coupled and the opposed sides of said elements seated in the respective channels of said body section, and relatively movable clamping members mounted upon opposite sides of said body section for engagement upon the outer sides of the respective elements to be coupled, and each of said members having a relatively adjustable element inseparably associa ed therewith for adjustable and detachable connec ion with said body section.

2. A device for rigidly coupling two crossed elements, comprising a body section in the form of a flat metal casting having channels formed in the opposite sides thereof and disposed in crosswise angular relation to each other, said body section being adapted to be positioned between the elements to be coupled and the opposed sides of said elements seated in the respective channels of said body section, relatively movable clamping members mounted upon opposite sides of said body section for engagement upon the outer sides of the respective elements to be coupled, an adjusting bolt for each clamping member, and means inseparably connecting said bolt with the clamping member while permitting of its adjustment relative thereto, and said body section having threaded openings therein to adjustably and removably receive the threaded sections of said bolts.

3. A device for rigidly coupling two crossed elements, comprising a body section in the form of a flat metal casting having channels formed in he opposite sides thereof and disposed in crosswise angular relation to each other, said body section being adapted to be positioned between the elements to be coupled and the opposed sides of said elements seated in the respective channels of said body se tion, clamping members opposed to the respective channels in said body section for engagement with the outer sides of the elements to be coupled, said clamping members being pivotally mounted at one of their ends upon the body section for swinging movement relative thereto, adjusting bolts and means inseparably connecting said bolts with the free ends of the respective clamping members while permitting of axial and angular movement of the bolts relative to said members, and said body section having threaded openings therein to adjustably and removably receive the threaded sections of the respective bolts.

4. A device for rigidly coupling two crossed elements, comprising a body section in the form of a flat metal casting having channels formed in the opposite sides thereof and disposed in crosswise angular relation to each other, said body section being adapted to be positioned between the elements to be coupled and the opposed sides of said elements seated in the respective channels of said body section, clamping members opposed to the respective channels in said body section for engagement with the outer sides of the elements to be coupled, said clamping members being pivotally mounted at one of their ends upon the body section for swinging movement relative thereto, adjusting bolts and means inseparably connecting said bolts with the free ends of the respective clamping members while permitting of relative axial and angular movement of the bolts relative to said members, said body section having threaded openings therein to adjustably and removably receive the threaded sections of the respective bolts, said body section being further provided adjacent the pivoted end of each clamping member with a stop rib engageable by the clamping member to limit the swinging movement of said clamping member to its open position.

5. A device for rigidly coupling two crossed elements comprising a body section consisting of a flat metal casting having concave channels or seats in its opposite sides disposed in crosswise angular relation to each other and adapted to receive the opposed side portions of the crossed elements to be coupled, clamping members pivotally mounted at one of their ends on opposite sides of said body section, each of said members consisting of a concavo-convex metal plate having its concave side in opposed complemental relation to one of the channels in said body section for engagement upon the outer side of one of said elements to be coupled, each of said plates tapering in width from its pivoted to its free end and increasing in thickness towards the latter end thereof to afford an increased area of the concave bearing surface, said plate being provided on its outer surface and along each of its longitudinal edges with reinforcing ribs or flanges, and an adjusting bolt for each clamping member inseparably connected with the free end thereof, said body section having threaded openings therein to adjustably and removably receive the threaded portions of said clamping bolts.

6. A device for rigidly coupling two crossed elements, comprising a body section consisting of a flat metal casting having concave channels or seats in its opposite sides disposed in crosswise angular relation to each other and adapted to receive the opposed side portions of the crossed elements to be coupled, clamping members pivotally mounted at one of their ends on opposite sides of said body section, each of said members consisting of a concavo-convex metal plate having its concave side in opposed complemental relation to one of the channels in said body section for engagement upon the outer side of one of said elements to be coupled, each of said plates tapering in width from its pivoted to its free end and increasing in thickness towards the latter end thereof to afford an increased area of the concave bearing surface, said plate being provided on its outer surface and along each of its longitudinal edges with reinforcing ribs or flanges, and the free end of each of said clamping members being provided with a longitudinally elongated slot therein, a bolt loosely positioned through said slot having a head on one end to engage the outer side of said clamping member and having its other end threaded for adjustable and removable engagement in a threaded opening in said body section, and means limiting the outward axial movement of the bolt through said slot to prevent its separation from the clamping member.

In testimony that I claim the foregoing as my invention, I have signed my name hereto.

FREDERIC A. DAVIDSON.